United States Patent
Nishida

[11] Patent Number: 6,157,484
[45] Date of Patent: Dec. 5, 2000

[54] CONFOCAL MICROSCOPE AND RELAY OPTICAL SYSTEM FOR USE IN CONFOCAL MICROSCOPE AND THE LIKE

[75] Inventor: Hiroyuki Nishida, Hachioji, Japan

[73] Assignee: Olympus Optical Co., Ltd., Tokyo, Japan

[21] Appl. No.: 09/401,605

[22] Filed: Sep. 22, 1999

[30] Foreign Application Priority Data

Oct. 2, 1998 [JP] Japan .................................. 10-281349

[51] Int. Cl.⁷ ........................... G02B 13/06; G02B 21/06
[52] U.S. Cl. ........................... 359/434; 359/368; 359/385
[58] Field of Search .................................. 359/362–363, 359/389–390, 420–422, 434–435, 676, 691, 793–794

[56] References Cited

U.S. PATENT DOCUMENTS

| | | | |
|---|---|---|---|
| 4,884,880 | 12/1989 | Lichtman et al. | 359/385 |
| 4,927,254 | 5/1990 | Kino et al. | 359/368 |
| 5,729,385 | 3/1998 | Nishida et al. | 359/434 |
| 5,808,791 | 9/1998 | Kawano et al. | 359/368 |
| 5,825,533 | 10/1998 | Yonezawa | 359/389 |
| 5,896,224 | 4/1999 | Kapitza | 359/389 |

FOREIGN PATENT DOCUMENTS

| | | |
|---|---|---|
| 61-210312 | 9/1986 | Japan . |
| 9-33804 | 2/1997 | Japan . |
| 10-26735 | 1/1998 | Japan . |
| 1164241 | 9/1969 | United Kingdom ................... 359/389 |

*Primary Examiner*—Thong Nguyen
*Attorney, Agent, or Firm*—Pillsbury Madison & Sutro LLP

[57] ABSTRACT

A confocal unit that can be removably attached to a microscope body to construct a confocal microscope that is compact and suffers a minimal loss of brightness. A relay optical system for use in the confocal microscope has a compact structure with a reduced overall length and requires a reduced number of lens elements. A scanning disc placed at the image position of an objective lens is illuminated with light from a light source. Light passing through the scanning disc illuminates a specimen through the objective lens. Light reflected from the specimen passes through the objective lens again to form an image near the scanning disc. Light passing through the scanning disc passes through a relay optical system to form a specimen image. The scanning disc is rotated at high speed to scan the specimen with illuminating light at high speed, thereby obtaining a specimen image. The image is received with an image pickup device. The illuminating optical system, the scanning disc and the relay optical system can be removably attached to the microscope body as a confocal unit. The scanning disc, the relay optical system and the image pickup device are arranged in approximately the same straight line.

7 Claims, 12 Drawing Sheets

FIG. 6(a)
Spherical aberration
NA0.030

F-line
g-line
C-line
d-line

FIG. 6(b)
Coma
y=5.5

FIG. 6(c)
Astigmatism
y=5.5

FIG. 8(a)
Spherical aberration
NA 0.030

FIG. 8(b)
Coma
y = 5.5

FIG. 8(c)
Astigmatism
y = 5.5

FIG. 10(a)
Spherical aberration
NA 0.60

FIG. 10(b)
Coma
y = 5.5

FIG. 10(c)
Astigmatism
y = 5.5

Spherical aberration
NA 0.030

FIG. 12(b)

Coma
y = 5.5

FIG. 12(c)

Astigmatism
y = 5.5

CONFOCAL MICROSCOPE AND RELAY OPTICAL SYSTEM FOR USE IN CONFOCAL MICROSCOPE AND THE LIKE

BACKGROUND OF THE INVENTION

The present invention relates to a confocal microscope and also relates to a relay optical system used mainly in a confocal microscope. More particularly, the present invention relates to a confocal unit used mainly for observation of an image of a specimen by imaging and displaying a confocal image with an image pickup device and a display device, which can be removably attached to a microscope body to construct a confocal microscope that is compact in size as a whole and suffers a minimal loss of brightness.

There has heretofore been publicly known a confocal microscope in which a scanning disc for confocal microscopy, such as a Nipkow disc, which is positioned in conjugate relation to a specimen, is rotated at high speed to scan the specimen with illuminating light, thereby obtaining a confocal image of the specimen. Such a confocal microscope is described in detail, for example, in U.S. Pat. No. 4,927,254 and commercially available from various manufacturers.

Japanese Patent Application Unexamined Publication (KOKAI) Number (hereinafter referred to as "JP(A)") 10-26735 (1998) discloses a confocal unit that can be removably attached to a microscope to construct a confocal microscope system. In this confocal unit, a laser is used as a light source to illuminate a specimen through a microlens array corresponding to pinholes on a scanning disc, thereby obtaining a bright confocal image. In the confocal unit, the optical axis of a C-mount and a photographing device lie on the same straight line.

Optical systems for relaying an image formed by an objective lens or the like include one type of relay optical system that comprises two lens units each having a positive focal length and that has a relatively wide spacing between the two lens units. Examples of such a relay optical system are disclosed in JP(A) 61-210312 (1986) and 09-33804 (1997).

Confocal microscopes commercially available from various manufacturers at present are designed so that a confocal image can be visually observed. To allow visual observation, the height of the eyepiece portion from the desk surface (i.e. eye point) must be within certain limits. That is, if the eye point is excessively high, it becomes difficult to look through the microscope. Accordingly, the relay optical system usually adopts a folded optical path arrangement or the like in which the optical path is folded in a plane perpendicular to the optical axis of the objective lens, thereby keeping the eye point from becoming high. However, a large number of mirrors are used to form such a folded optical path. The number of reflections by mirrors may reach as many as ten- or more reflections in total from the light source to the observer's eye, which will result in a large loss of brightness. In confocal microscopes, to which the present invention relates, loss of brightness is a serious problem in that it is difficult to perform observation because the image is unfavorably dark unless a high-intensity light source is used. Furthermore, because the arrangement becomes complicated, the number of parts used increases, and thus the cost is unfavorably high.

The confocal unit disclosed in JP(A) 10-26735 (1998) is designed to be removably attached to a microscope to construct a confocal microscope system and therefore has a relatively simplified arrangement. However, illuminating light must be applied from above the microlens array owing to the principle of the device. Accordingly, viewing light must be drawn out from the optical path halfway through a beam splitter or the like, and it is necessary to use at least several mirror members. Consequently, loss of brightness cannot be avoided.

Even if the number of mirror members used is minimized, if the overall length of the optical system increases, the unit itself lengthens and becomes unstable when attached to a microscope, and it becomes inconvenient to install an image pickup device. Therefore, it is necessary to make the overall length of the optical system as short as possible. However, in the confocal unit, the specimen needs to be illuminated through the scanning disc. Therefore, it is necessary to ensure a space sufficient to place a prism member or a mirror member for introducing illuminating light between the scanning disc and the relay optical system. From this point of view, relay optical systems disclosed in JP(A) 61-210312 (1986) and 09-33804 (1997) are similar in arrangement to the relay optical system according to the present invention.

In a relay optical system that comprises two lens units each having a positive focal length as disclosed in JP(A) 61-210312 (1986) and 09-33804 (1997), the distance L from the intermediate image position to the relay image position is assumed to be $2\times(f_1+f_2)$, where $f_1$ is the focal length of the front lens unit, and $f_2$ is the focal length of the rear lens unit.

JP(A) 61-210312 (1986) adopts an arrangement in which the specimen-side lens surface in the second lens unit is a strong concave surface directed toward the object side in order to place a chromatic dispersion prism between the lens final surface and the image plane. By using a strong concave surface directed toward the object side as the specimen-side lens surface in the second lens unit, JP(A) 61-210312 (1986) intends to shift the principal point position toward the image plane to thereby increase the distance between the second lens unit and the image plane. With this arrangement, however, although the distance between the second lens unit and the image plane can be increased, because the distance between the first lens unit and the second lens unit is also increased, the distance between the intermediate image and the first lens unit inevitably reduces undesirably in a limited space "L". Accordingly, with this arrangement, the spacing between the scanning disc, which is placed at the intermediate image position, and the first lens unit reduced, so that it becomes difficult to place a prism member or a mirror member for introducing illuminating light. If the focal length of each lens unit is increased, it becomes possible to place a prism member or a mirror member for introducing illuminating light. However, "L" also lengthens if the focal length of each lens unit is increased. Consequently, it becomes impossible to construct the optical system in a compact form.

In the relay optical system disclosed in JP(A) 09-33804 (1997), the first lens unit comprises a positive meniscus lens having a concave surface directed toward the intermediate image side. If the concave surface is directed toward the intermediate image side, the principal point position shifts closer to the image plane side. Therefore, it is impossible to ensure a sufficiently wide spacing between the intermediate image position and the first lens unit. Accordingly, it becomes difficult to place a prism member or a mirror member for introducing illuminating light. In this case also, if the focal length of each lens unit is increased, it becomes possible to place a prism member or a mirror member for introducing illuminating light. However, "L" also lengthens if the focal length of each lens unit is increased. Consequently, it becomes impossible to construct a compact optical system.

SUMMARY OF THE INVENTION

In view of the above-described problems with the prior art, an object of the present invention is to provide a confocal unit used mainly for observation of an image of a specimen by obtaining a confocal image and further imaging and displaying the confocal image with an image pickup device and a display device, which can be removably attached to a microscope body to construct a confocal microscope that is compact in size as a whole and suffers a minimal loss of brightness. Another object of the present invention is to provide a relay optical system used mainly in the above-described confocal microscope, which has a compact structure with a reduced overall length and requires a relatively small number of lens elements.

To attain the above-described object, the present invention provides a confocal microscope having a light source and a scanning disc placed at one of an image position of an objective lens, a position conjugate to the image position, and a position near either of these positions. An illuminating optical system is placed between the light source and the scanning disc to lead light from the light source to the scanning disc. The objective lens is provided in a microscope body to converge light from the scanning disc onto a specimen. A relay optical system relays light from the specimen that has passed through the objective lens and the scanning disc and forms an image. An image pickup device is placed at a position where the image is formed. The illuminating optical system, the scanning disc and the relay optical system are arranged as a unit separate from the microscope body. The unit is removably attached to the microscope body. The scanning disc, the relay optical system and the image pickup device are placed approximately in series.

In this case, it is desirable that the relay optical system should include, in order from the specimen side thereof, a first lens unit and a second lens unit, each having a positive focal length, and that each of the first and second lens units should include one of a positive single lens and a positive cemented lens, which has a convex surface directed toward the specimen side and is placed closest to the specimen side in the lens unit, and further that at least one of the first and second lens units should have a concave lens, and the following condition should be satisfied:

$$L/8 \leq D \leq L/3 \tag{1}$$

where L is the distance from the image position of the objective lens to the image pickup surface of the image pickup device, and D is the distance from the final surface of the first lens unit to the first surface of the second lens unit.

In addition, it is desirable to satisfy the following condition:

$$|\phi_-| \geq 1.5\phi_+ \tag{2}$$

where $\phi_-$ is the total sum of the reciprocals of the focal lengths of negative lenses in the single and cemented lenses constituting the relay optical system, and $\phi_+$ is the reciprocal of the focal length of either one of the positive lenses closest to the specimen side in the first and second lens units that has a greater value for the reciprocal of the focal length.

A mirror member or a prism member may be placed between the scanning disc and the relay optical system to lead light from the illuminating optical system to the scanning disc.

The relay optical system may be mounted in such a manner that it is switchable for another relay optical system.

According to the present invention, there is provided a relay optical system including, in order from the specimen side thereof, a first lens unit and a second lens unit, each having a positive focal length. Each of the first and second lens units includes one of a positive single lens and a positive cemented lens, which has a convex surface directed toward the specimen side and is placed closest to the specimen side in the lens unit. At least one of the first and second lens units has a concave lens, and the following condition is satisfied:

$$L/8 \leq D \leq L/3 \tag{1}$$

where L is the distance from the image position of the objective lens to the image pickup surface of an image pickup device, and D is the distance from the final surface of the first lens unit to the first surface of the second lens unit.

In this case, it is desirable to satisfy the following condition:

$$|\phi_-| \geq 1.5\phi_+ \tag{2}$$

where $\phi_-$ is the total sum of the reciprocals of the focal lengths of negative lenses in the single and cemented lenses constituting the relay optical system, and $\phi_+$ is the reciprocal of the focal length of either one of the positive lenses closest to the specimen side in the first and second lens units that has a greater value for the reciprocal of the focal length.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5(a) and 5(b), referred to collectively as FIG. 5, are diagrams showing a third embodiment of the present invention, in which.

FIGS. 6(a), 6(b) and 6(c), referred to collectively as FIG. 6, are aberrational diagrams in which

FIG. 7(a) and 7(b), referred to collectively as FIG. 7 are diagrams showing a fourth embodiments of the present invention, in which.

FIGS. 8(a), 8(b) and 8(c), referred to collectively as FIG. 8, are aberrational diagrams in which

FIGS. 9(a) and 9(b), referred to collectively as FIG. 9 are diagrams showing a fifth embodiment of the present invention, in which

FIGS. 10(a), 10(b) and 10(c), referred to collectively as FIG. 10, are aberrational diagrams in which

FIGS. 11(a) and 11(b), referred to collectively as FIG. 11 are diagrams showing a sixth embodiment of the present invention, in which.

FIGS. 12(a), 12(b) and 12(c), referred to collectively as FIG. 12, are aberrational diagrams in which

FIGS. 15(a) and 15(b), referred to collectively as FIG. 15 are diagrams showing Nipkow discs, in which

DESCRIPTION OF THE PREFERRED EMBODIMENTS

First, the reasons for adopting the above-described arrangements in the present invention, together with the functions thereof, will be described below.

By virtue of the above-described arrangement of the confocal microscope, the confocal unit, which is removably attached to the microscope body, can be constructed without using an extra reflecting mirror, e.g. a mirror or a prism. Accordingly, the confocal unit can be formed in a simple structure, not a complicated structure such as a folded optical path arrangement. In addition, because the loss of brightness can be minimized, a bright image can be observed.

Regarding the arrangement of the whole microscope, it is desirable that not only the scanning disc, the relay optical system and the image pickup device, which constitute a confocal unit removably attached to the microscope body, but also the objective lens, the image-forming lens, etc. should be arranged in approximately the same straight line. However, in attaching the confocal unit to the microscope body, there are cases where the confocal unit must be attached to the microscope body at a position away from the optical axis of the objective lens and a mirror member or the like must be used. Therefore, if at least the scanning disc, the relay optical system and the image pickup device are arranged in approximately the same straight line, the number of reflections is reduced compared to the case of an arrangement using a folded optical path or the like. Therefore, an object of the present invention can be attained.

Next, the relay optical system according to the present invention will be described. As has been stated above, in a relay optical system that includes two lens units each having a positive focal length, the power distribution of each lens unit in a space represented by the distance L from the intermediate image position to the relay image position is an important consideration.

In the microscope optical system, the pupil of the objective lens is usually projected approximately at infinity by the image-forming lens. If the relay optical system comprises a single lens unit, i.e. a first lens unit $G_1$, the pupil, which is usually projected approximately at infinity by the image-forming lens, is projected at a position immediately behind the relay optical system by the relay optical system because the focal length is shortened in order to construct the whole optical system in a compact form. If the pupil is projected immediately behind the relay optical system, the angle of the principal ray in an extra-axial image-forming light beam becomes undesirably large. If the extra-axial principal ray angle is large, the image-forming performance is unfavorably affected by the angle characteristics of the image pickup device. Accordingly, a second lens unit $G_2$ is needed in order to control the pupil position so as to minimize the angle of the extra-axial principal ray. It should, however, be noted that the relationship between the first lens unit $G_1$ and the second lens unit $G_2$ may be reversed. That is, the arrangement may be such that the position where the pupil is projected by the first lens unit $G_1$ is located near the front focal point of the second lens unit $G_2$, and the second lens unit $G_2$ is arranged to ensure the required image-forming performance while minimizing the angle of the principal ray in an extra-axial light beam exiting from the second lens unit $G_2$. At this time, the spacing D between the first lens unit $G_1$ and the second lens unit $G_2$ is given by $D \approx f_{b1} + f_{f2}$, where $f_{b1}$ is the distance between the final surface of the first lens unit $G_1$ and the back focal point of the first lens unit $G_1$, and $f_{f22}$ is the distance between the first surface of the second lens unit $G_2$ and the front focal point of the second lens unit $G_2$.

From the viewpoint of ensuring the required image-forming performance, particularly correction of curvature of field, an optical system having a positive power as a whole preferably uses a positive power at a position where the ray height is high and a negative power at a position where the ray height is low, for the purpose of minimizing the Petzval sum. The reason for this is as follows. The contribution of the power of each lens unit to the entire optical system is determined by the ratio between the focal length of each lens unit and the ray height. Therefore, even when the power of the entire optical system is the same, if a negative power is used at a position where the ray height is low, the focal length can be shortened. This is, therefore, favorable for minimization of the Petzval sum. Conversely, if a positive power is used at a position where the ray height is high, the focal length increases. This is, therefore, favorable for keeping the Petzval sum from increasing.

Let us consider ensuring the required image-forming performance (correction of curvature of field, in particular)

with the first lens unit $G_1$. If the first surface is a concave surface, the performance cannot be ensured unless the distance between the concave surface and the intermediate image position $I_1$ is short. The reason for this is that if the distance to the intermediate image position $I_1$ is long, the ray height becomes high, and hence the effect of the concave surface weakens unfavorably. Therefore, the best arrangement is such that a convex surface is used as the first surface to ensure a space for placing an optical path splitting or coupling device, and at a position where the ray height is high, the ray height is lowered by utilizing the positive power, and a concave lens is used at a position where the ray height is lowered. With a view to minimizing the amount of aberrations produced in the second lens unit $G_2$, the first surface is preferably a convex lens having a convex surface directed toward the specimen side. The reason for this is that aberrations produced in the whole second lens unit $G_2$ can be reduced by dispersing the positive power to thereby allow each surface to have a relatively large radius of curvature.

Next, let us consider ensuring the required image-forming performance (correction of curvature of field, in particular) with the second lens unit $G_2$. If the first surface of the second lens unit $G_2$ is a concave surface, it is placed in the vicinity of the position of the pupil projected by the first lens unit $G_1$. The reason for this is that the ray height near the pupil position is low; therefore, the concave surface works effectively. Thus, the ray height is raised by the concave surface, and a positive lens is placed at a position where the ray height is raised, thereby ensuring the required performance. This is the same arrangement as that of JP(A) 61-210312 (1986). With this arrangement, the distance between the second lens unit $G_2$ and the image plane and the distance between the first lens unit $G_1$ and the second lens unit $G_2$ become undesirably long in comparison to the overall length. Therefore, it is difficult to ensure a space for spacing an optical path splitting or coupling device while reducing the overall length L from a position $I_1$, where a first image of the specimen is formed, to a position $I_2$ where the relayed first image is re-formed on the image pickup device. Accordingly, it is desirable to adopt an arrangement in which the first surface, which is a convex surface, is placed at a position which is closer to the first lens unit $G_1$ than the position of the pupil projected by the first lens unit $G_1$ and at which the ray height has not yet completely lowered, to lower the ray height, and a concave lens is placed subsequently to the convex surface, thereby ensuring the required performance and, at the same time, ensuring a space for placing an optical path splitting or coupling device in the limited space while minimizing the distance between the second lens unit $G_2$ and the image plane and the distance between the first lens unit $G_1$ and the second lens unit $G_2$. In this case, if the first surface of the first lens unit $G_1$ is a concave surface, it is difficult to ensure a space for placing an optical path splitting or coupling device, as has already been stated above. Therefore, it is desirable that the first surface of the first lens unit $G_1$ should be a convex lens having a convex surface directed toward the specimen side.

In addition, it is desirable that the spacing D between the lens final surface of the first lens unit $G_1$ and the first surface of the second lens unit $G_2$ should satisfy the condition (1), i.e. $L/8 \leq D \leq L/3$. In a case where each of the first lens unit $G_1$ and the second lens unit $G_2$ comprises a positive single lens, the spacing D is given by $D \approx f_{b1} + f_{f2} \approx L/2$.

If the spacing D exceeds the upper limit of the condition (1), i.e. $L/3$, the overall length of each of the first lens unit $G_1$ and the second lens unit $G_2$ must be shortened in order to ensure a space for spacing an optical path splitting or coupling device and a space required on the image pickup device side (a certain spacing is required between the image pickup device installation position and the image pickup surface to place a low-pass filter, etc.). In this case, it becomes difficult to ensure a space for placing lenses including a concave lens. Consequently, the image-forming performance, i.e. correction of spherical aberration, curvature of field, etc. is degraded to a considerable extent.

If the spacing D is smaller than the lower limit of the condition (1), i.e. $L/8$, the lens arrangement becomes excessively complicated. From the viewpoint of ensuring a space for placing an optical path splitting or coupling device and of ensuring the required performance, there is no lower limit. However, the fact that the spacing D is small means that a large number of lenses are placed in the space. Therefore, in the case of an arrangement having a relatively small number of lenses, it is preferable for the spacing D not to be smaller than the above-described lower limit.

In addition, it is desirable to satisfy the following condition:

$$|\phi_-| \geq 1.5\phi_+ \qquad (2)$$

where $\phi_-$ is the total sum of the reciprocals of the focal lengths of the single and cemented lenses constituting the relay optical system, which reciprocals assume negative values, and $\phi_+$ is the reciprocal of the focal length of either one of the positive lenses closest to the specimen side in the first lens unit $G_1$ and the second lens unit $G_2$ that has a greater value for the reciprocal of the focal length.

In the case of a relay optical system having a positive power as a whole and a relatively simple arrangement, a large number of negative powers cannot be used. Accordingly, it is necessary to increase each individual negative power used so as to cancel the Petzval sum produced by other positive powers. Let us make an approximation with a thin lens system. The Petzval sum is obtained from the focal length of each lens and the refractive index of the vitreous material used. The refractive index of each vitreous material does not largely differ from one another. If the refractive index is regarded as approximately constant in the optical system, power can be replaced by the reciprocal of the focal length of the lens.

If the negative power $\phi_-$ used in the relay optical system is smaller than the lower limit of the condition (2), i.e. $1.5\phi_+$, the Petzval sum produced by the positive power other than $\phi_+$ cannot sufficiently be canceled, resulting in under correction of curvature of field.

In the confocal microscope arranged as described above, the relay optical system relays an image $I_1$ of a specimen formed by the objective lens and the image-forming lens and re-forms the image $I_1$ on the image plane $I_2$. The relay optical system preferably includes, in order from the specimen side thereof, an optical path splitting or coupling device, a first lens unit $G_1$ having a positive focal length, and a second lens unit $G_2$ having a positive focal length. In the relay optical system, it is desirable that the distance D between the final surface of the first lens unit $G_1$ and the first surface of the second lens unit $G_2$ should satisfy the following condition:

$$L/8 \leq D \leq L/3 \qquad (1)$$

where L is the distance between the specimen image $I_1$ and the image plane $I_2$.

It is also desirable that each of the first lens unit $G_1$ and the second lens unit $G_2$ should have a positive single or cemented lens as a lens closest to the specimen side, which has a convex surface directed toward the specimen side, and that at least one of the first lens unit $G_1$ and the second lens unit $G_2$ should have a concave lens. In addition, it is desirable to satisfy the condition (2). The optical path coupling device is preferably a mirror member or a prism member for leading light from the illuminating optical system to the scanning disc. By virtue of the above-described arrangement, the confocal unit can be removably attached to the microscope body to construct a confocal microscope, and the loss of brightness can be minimized. In addition, with above-described relay optical system arrangement, a confocal microscope having a compact structure with a reduced overall length can be provided even more surely.

It is desirable to arrange the relay optical system so that it is switchable to another relay optical system. With this arrangement, it is possible to change the magnification and so forth according to each particular purpose of observation.

Next, first to eighth embodiments of the confocal microscope, relay optical system and so forth according to the present invention will be described with reference to the accompanying drawings.

[First Embodiment]

Figure 1:
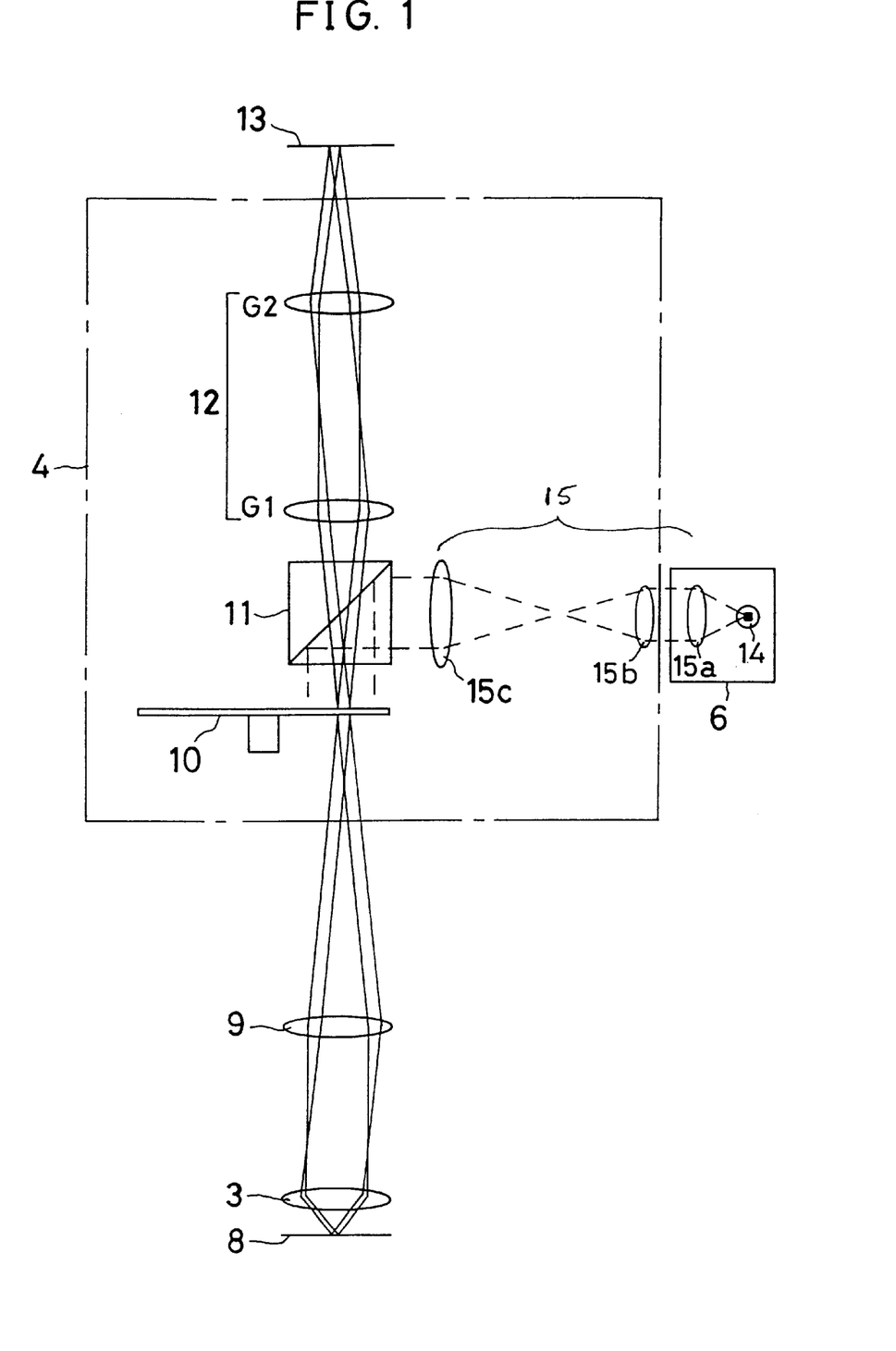
FIG. 1 is a diagram showing the arrangement of the entire optical system of a first embodiment of a confocal microscope according to a first embodiment of the present invention including a relay optical system.

A first embodiment of the present invention will be described below. FIG. 1 is a diagram showing the arrangement of a confocal microscope optical system. Light from a light source 14 passes through an illuminating optical system 15. The illuminating optical system 15 comprises a collimator lens 15a provided in a lamp house 6, a condenser lens 15b, and a collimator lens 15c. Then, the light enters an optical path coupling device 11, which is a half-mirror prism. Light reflected from the optical path coupling device 11 illuminates a scanning disc (e.g. a Nipkow disc) 10. Light passing through the scanning disc 10 illuminates a specimen 8 through an image-forming lens 9 and an objective lens 3. Light reflected from the specimen 8 passes through the objective lens 3 and the image-forming lens 9 again to return to the scanning disc 10. Light passing through the scanning disc 10 passes through the optical path coupling device 11 and a relay optical system 12 to reach an image plane 13 and is received by an image pickup device, e.g. a CCD, provided at the position of the image plane 13.

Figure 2:
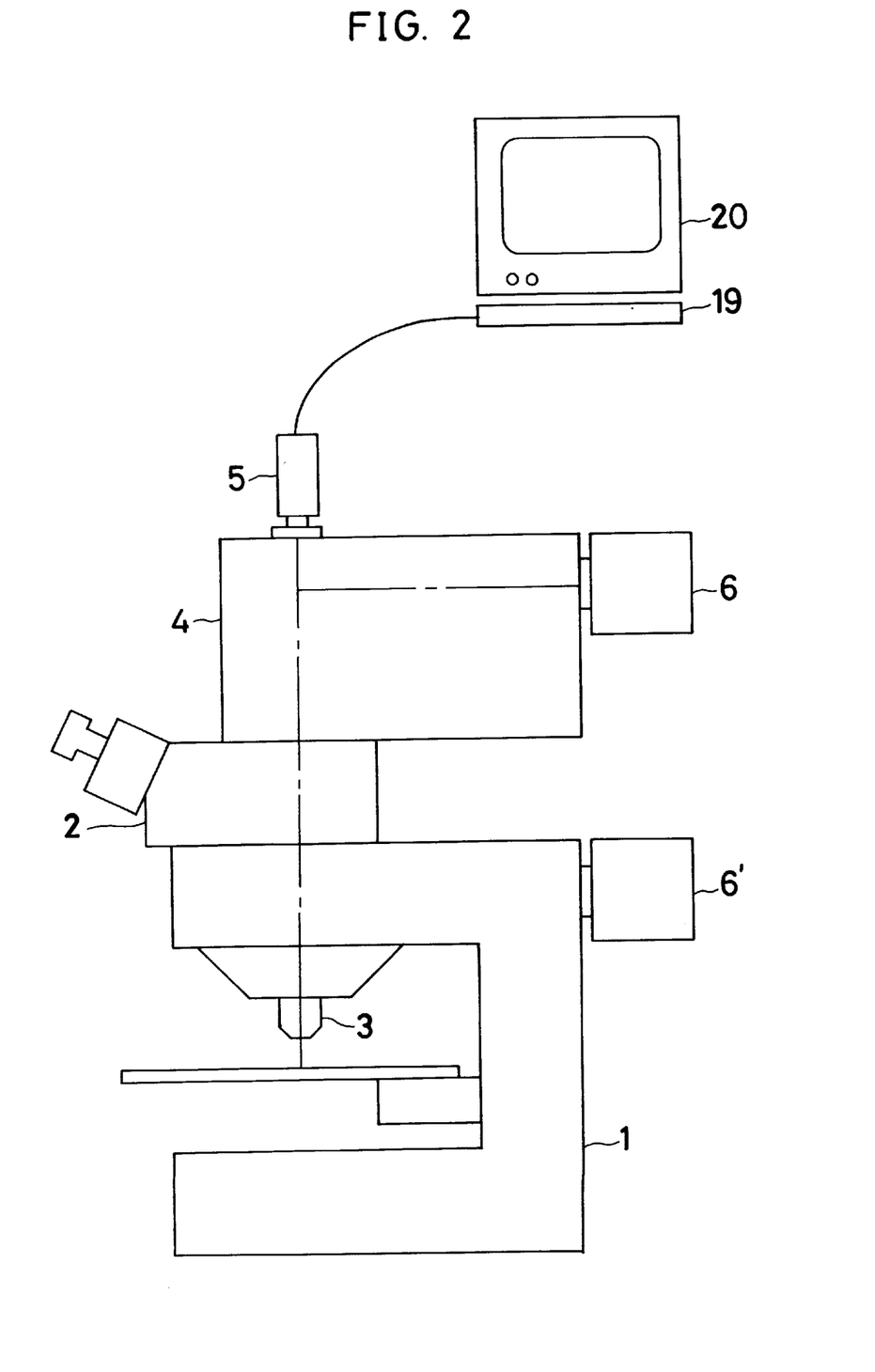
FIG. 2 is a diagram showing the arrangement of the whole system including the first embodiment of the confocal microscope system according to the first embodiment of the present invention.

FIG. 2 is a diagram showing the arrangement of a confocal microscope system according to the first embodiment of the present invention. A confocal unit 4 comprises the condenser lens 15b, the collimator lens 15c, the optical path coupling device 11, the scanning disc 10 and the relay optical system 12, which are shown in FIG. 1. The confocal unit 4 is adapted to be removably attached to the top of a barrel 2 to construct a confocal microscope system. In FIG. 2, reference numeral 1 denotes a base; 5 denotes an image pickup device, e.g. a CCD; 19 denotes an image capturing and computing unit; 20 denotes an image display device; and 6' denotes another lamp house provided on the microscope body.

In this embodiment, the objective lens 3, the image-forming lens 9 installed in the base 1 or the barrel 2, the scanning disc 10, the relay optical system 12 and the image pickup device 5 are placed in a straight line. Because no mirror or the like is used, there is substantially no loss of brightness throughout the system. It should be noted that in this embodiment the term "microscope body" refers to a part including the base 1 and the barrel 2.

Figure 3:
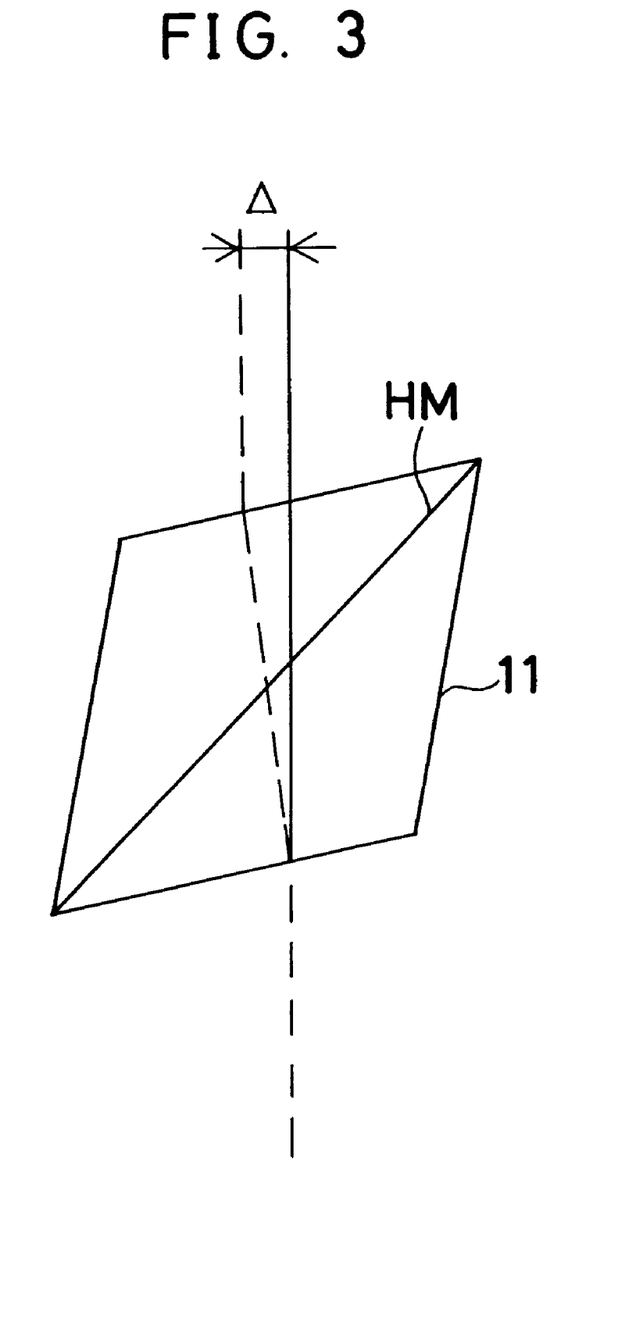
FIG. 3 is a diagram showing an optical coupling device having a different configuration from that of an optical coupling device shown in the optical system of FIG. 1.

In FIG. 1, the optical path coupling device 11 may be a half-mirror prism having a rhombic cross-sectional configuration as shown in FIG. 3. In FIG. 3, HM denotes a half-mirror surface. Such a half-mirror prism having a rhombic cross-sectional configuration is used to prevent flare which would otherwise be produced by prism surface reflection. In this case, however, the optical axis exiting from the prism is displaced with respect to the optical axis entering the prism by Δ, as shown in FIG. 3. Therefore, it is necessary to shift the optical system by the amount of displacement Δ. Accordingly, in this case, the above-mentioned components are placed not in a perfectly straight line but in an approximately straight line.

[Second Embodiment]

Figure 4:
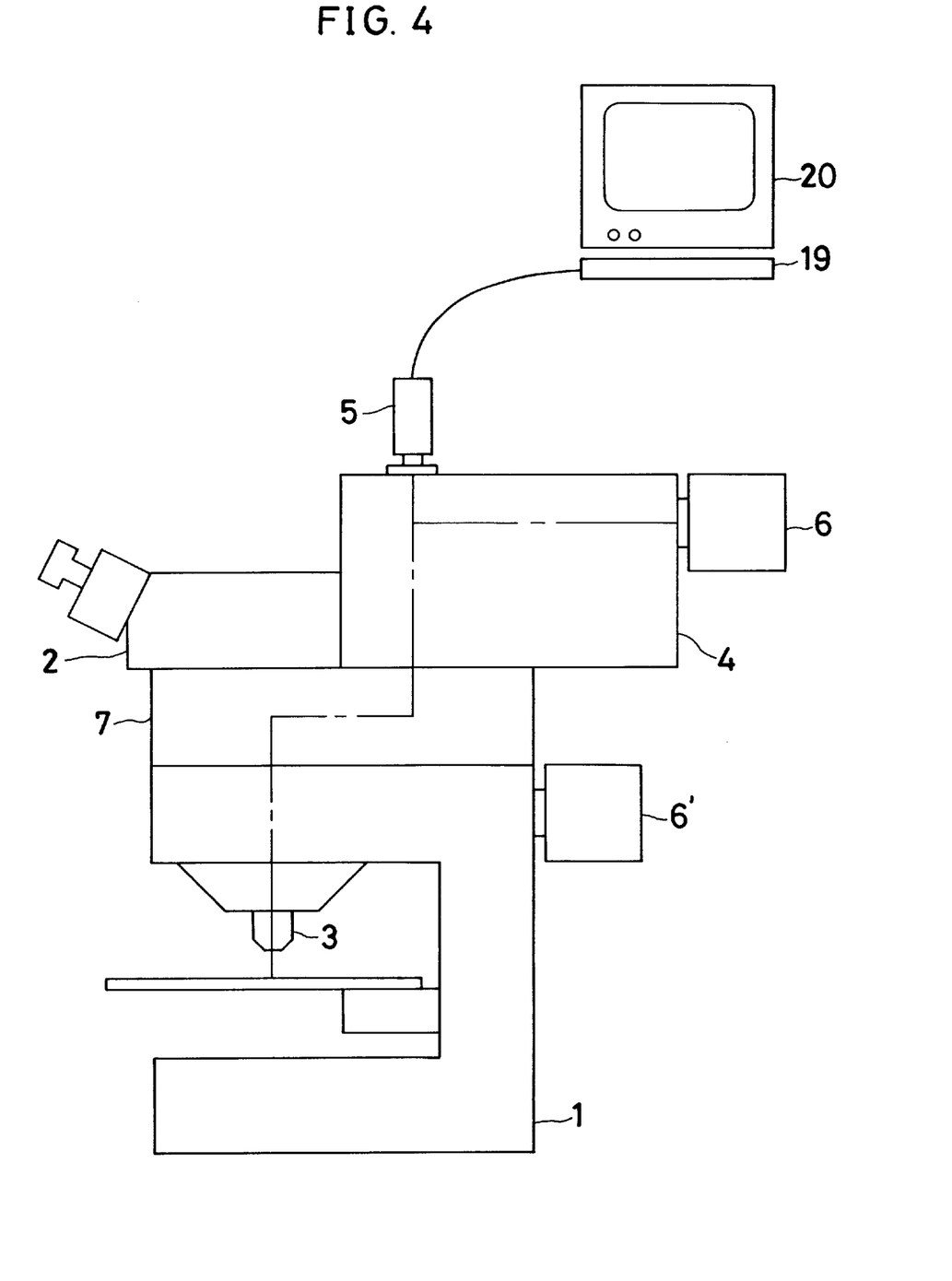
FIG. 4 is a diagram showing the arrangement of a confocal microscope system according to a second embodiment of the present invention.

A second embodiment of the present invention will be described below. FIG. 4 is a diagram showing the arrangement of a confocal microscope system according to the second embodiment. In this embodiment, the term "microscope body" refers to a part including the base 1, an intermediate barrel 7 and the barrel 2. The confocal unit 4 is adapted to be attached to the top of the intermediate barrel 7. In this embodiment, the optical axis of the objective lens 3 and the mutual optical axis of the confocal unit 4 and the image pickup device 5 are horizontally displaced with respect to each other from the viewpoint of installation of the confocal unit 4 and the stability of the apparatus. The arrangement in the confocal unit 4 is the same as that shown in FIG. 1. Because no mirror is used in the confocal unit 4, there is no loss of brightness in the confocal unit 4.

The optical path coupling device 11 may be a half-mirror prism such as that shown in FIG. 3. The effect and action of the half-mirror prism are as stated above.

[Third Embodiment]

Figures 5A, 5B:
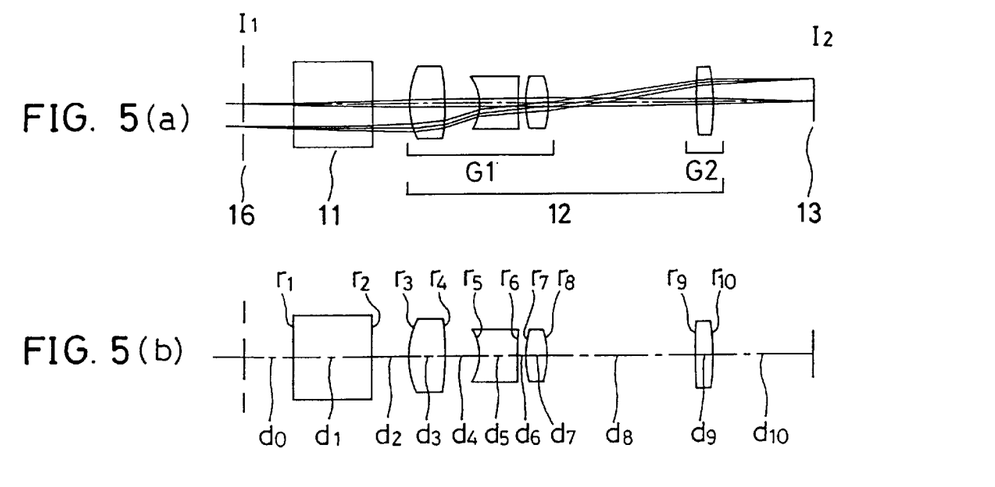
FIG. 5(a) is a sectional view of an optical coupling device and a relay optical system.
FIG. 5(b) shows the correspondence between surface numbers and surface separations in numeral data.

A third embodiment of the present invention will be described below. FIG. 5 is a diagram showing the arrangement of a relay optical system 12 according to the third embodiment. Part (a) of FIG. 5 shows an optical path, and part (b) of FIG. 5 shows lens surfaces and surface separations in numerical data (described later). Numerical data in this embodiment will be shown later.

Figure 6A:
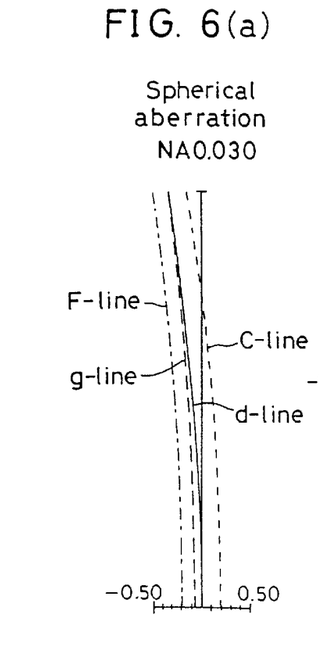
FIG. 6(a) shows spherical aberration.
Figure 6B:
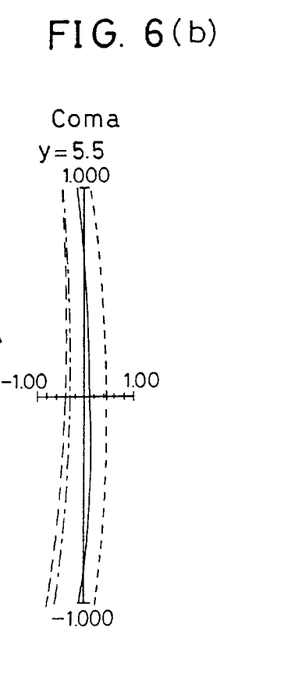
FIG. 6(b) shows coma and FIG. 6(c) shows astigmatism in the relay optical system according to the third embodiments of the present invention.
Figure 6C:
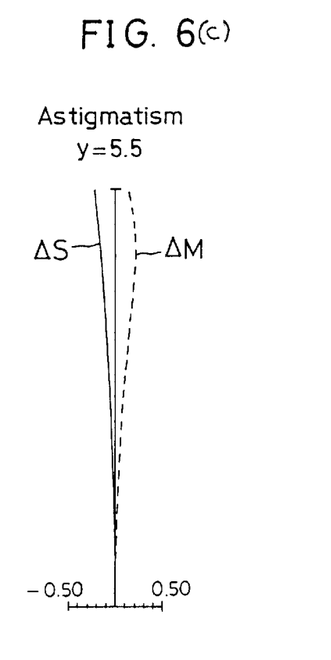

In this embodiment, a concave lens is used in the first lens unit $G_1$. FIG. 6 are aberrational diagrams showing spherical aberration, coma and astigmatism, which represent the performance of this embodiment.

In this embodiment, L=141 millimeters, and the magnification of the relay optical system 12 is 1×. Further, D=36.4284=L/3.87. $|\phi_-|=0.0905$, and $\phi_+=0.0498$. Hence, $|\phi_-|=1.82\phi_+ \geq 1.5\phi_+$.

Although in this embodiment the optical path splitting or coupling device 11 is clearly shown, this portion may be air as long as the system is arranged so that an optical path splitting or coupling device can be placed.

[Fourth Embodiment]

Figure 7A:
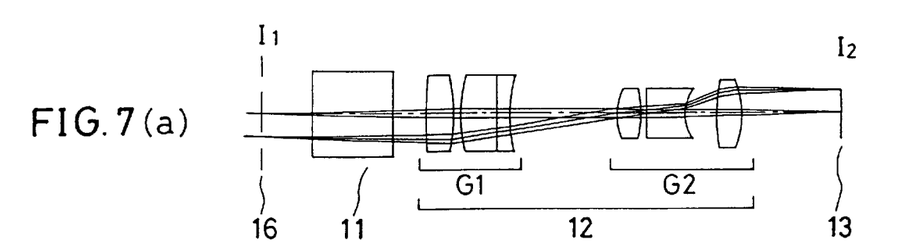
FIG. 7(a) is a sectional view of an optical coupling device and a relay optical system.
Figure 7B:
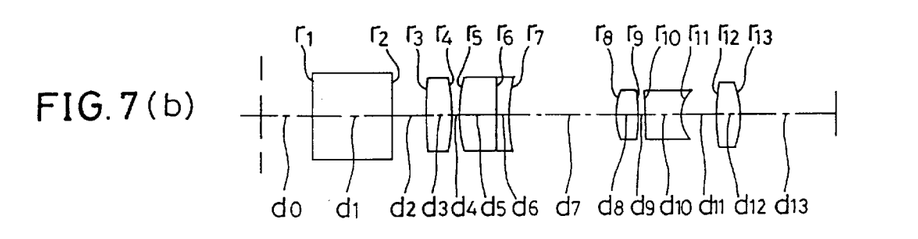
FIG. 7(b) shows the correspondence between surface numbers and surface separation in numeral data.

A fourth embodiment of the present invention will be described below. FIG. 7 is a diagram similar to FIG. 5, which shows the arrangement of a relay optical system 12 according to the fourth embodiment. Numerical data in this embodiment is shown later.

Figure 8A:
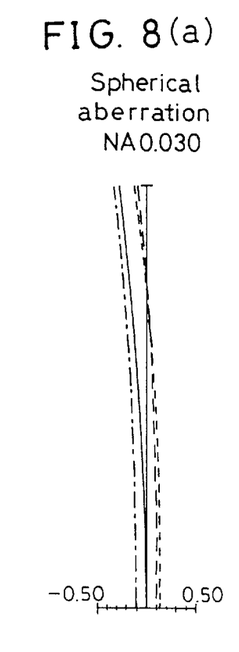
FIG. 8(a) shows spherical aberration.
Figure 8B:
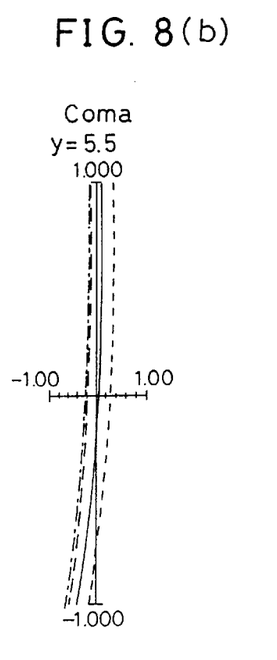
FIG. 8(b) shows coma and FIG. 8(c) shows astigmatism in the relay optical system according to the fourth embodiment of the present invention.
Figure 8C:
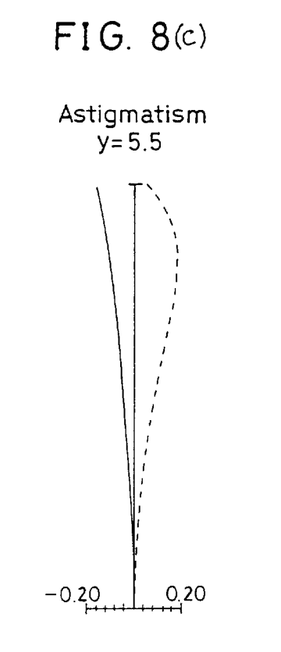

In this embodiment, concave lenses are used in both the first lens unit $G_1$ and the second lens unit $G_2$. FIG. 8 are aberrational diagram similar to FIG. 6, which show the performance of this embodiment.

In this embodiment, L=141.6 millimeters, and the magnification of the relay optical system 12 is 1×. Further, D=26.3676=L/5.37. $|\phi_-|=0.1019$, and $\phi_+=0.0499$. Hence, $|\phi_-|=2.04\phi_+ \geq 1.5\phi_+$.

[Fifth Embodiment]

Figures 9A, 9B:
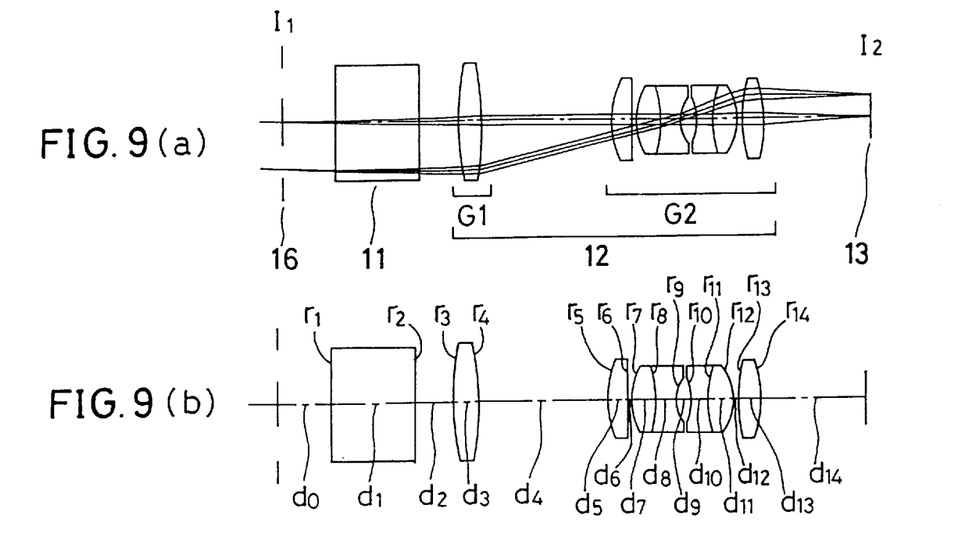
FIG. 9(a) is a sectional view of an optical coupling device and a relay optical system.
FIG. 9(b) shows the correspondence between surface numbers and surface separation in number data.

A fifth embodiment of the present invention will be described below. FIG. 9 is a diagram similar to FIG. 5, which shows the arrangement of a relay optical system 12 according to the fifth embodiment. Numerical data in this embodiment is shown later.

Figures 10A, 10B:
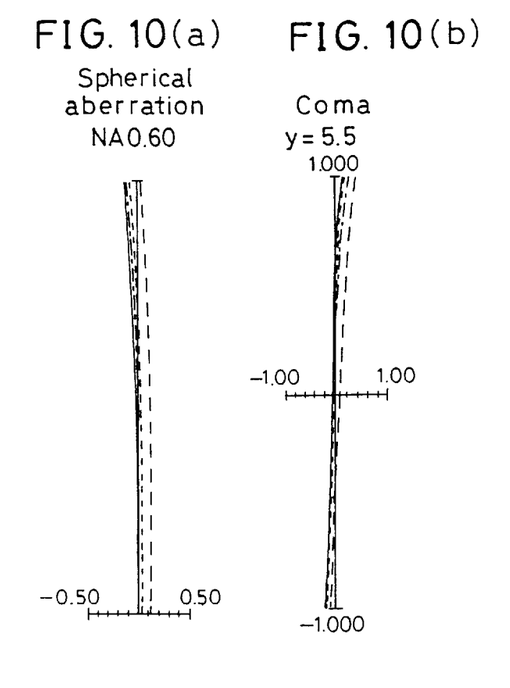
FIG. 10(a) shows spherical aberration.
FIG.10(b) shows coma and FIG. 10(c) shows astigmatism in the relay optical system according to the fifth embodiment of the present invention.
Figure 10C:
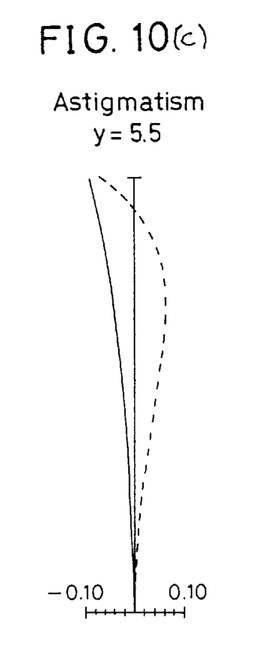

In this embodiment, concave lenses are used in the second lens unit $G_2$. FIG. 10 are aberrational diagrams similar to FIG. 6, which show the performance of this embodiment.

In this embodiment, L=140.8 millimeters, and the magnification of the relay optical system 12 is 0.5×. Further, D=31.3452=L/4.49. $|\phi_-|=0.0544$, and $\phi_+=0.0218$. Hence, $|\phi_-|=2.5\phi_+ \geqq 1.5\phi_+$.

[Sixth Embodiment]

Figures 11A, 11B:
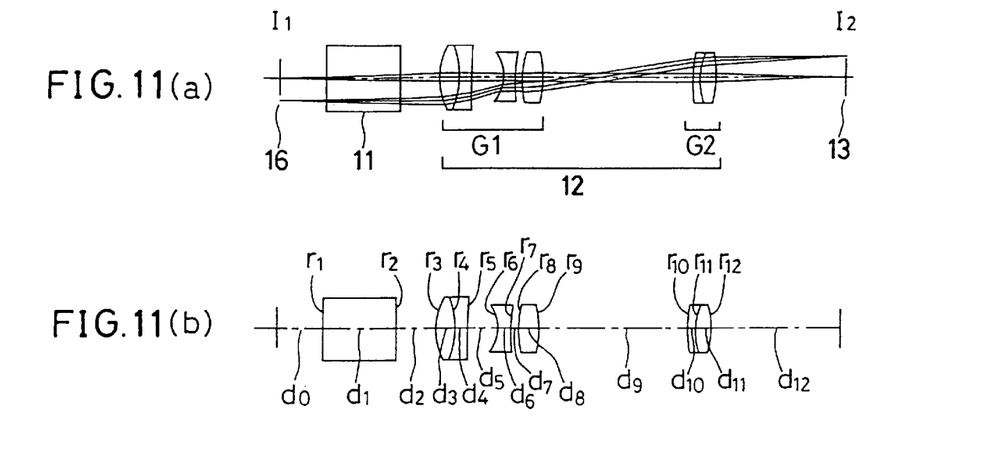
FIG. 11(a) is a sectional view of an optical coupling device and a relay optical system.
FIG. 11(b) shows the correspondence between surface numbers and surface separations in numeral data.

A sixth embodiment of the present invention will be described below. FIG. 11 is a diagram similar to FIG. 5, which shows the arrangement of a relay optical system 12 according to the sixth embodiment. Numerical data in this embodiment is shown later.

Figure 12A:
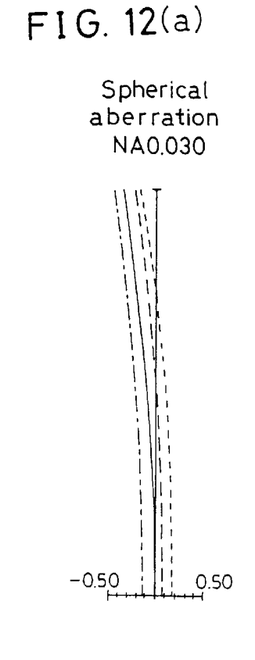
FIG. 12(a) shows spherical aberration.
Figure 12B:
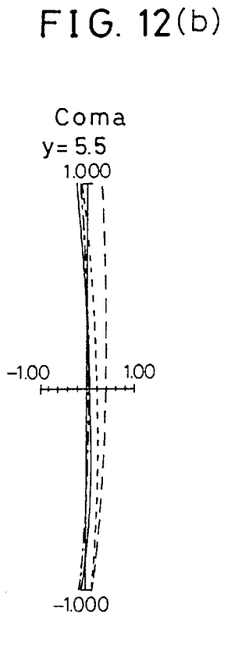
FIG. 12(b) shows coma and FIG. 12(c) shows astigmatism in the relay optical system according to the sixth embodiment of the present invention.
Figure 12C:
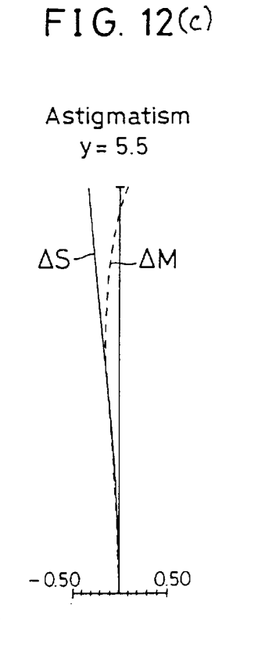

In this embodiment, concave lenses are used in both the first lens unit $G_1$ and the second lens unit $G_2$. In addition, a cemented lens having a convex surface directed toward the specimen side is placed closest to the specimen side. FIG. 12 are aberrational diagrams similar to FIG. 6, which show the performance of this embodiment.

In this embodiment, L=150.56 millimeters, and the magnification of the relay optical system 12 is 1×. Further, D=40.0998=L/3.75. $|\phi_-|=0.0884$, and $\phi_+=0.0521$. Hence, $|\phi_-|=1.7\phi_+ \geqq 1.5\phi_+$.

[Seventh Embodiment]

Figure 13:
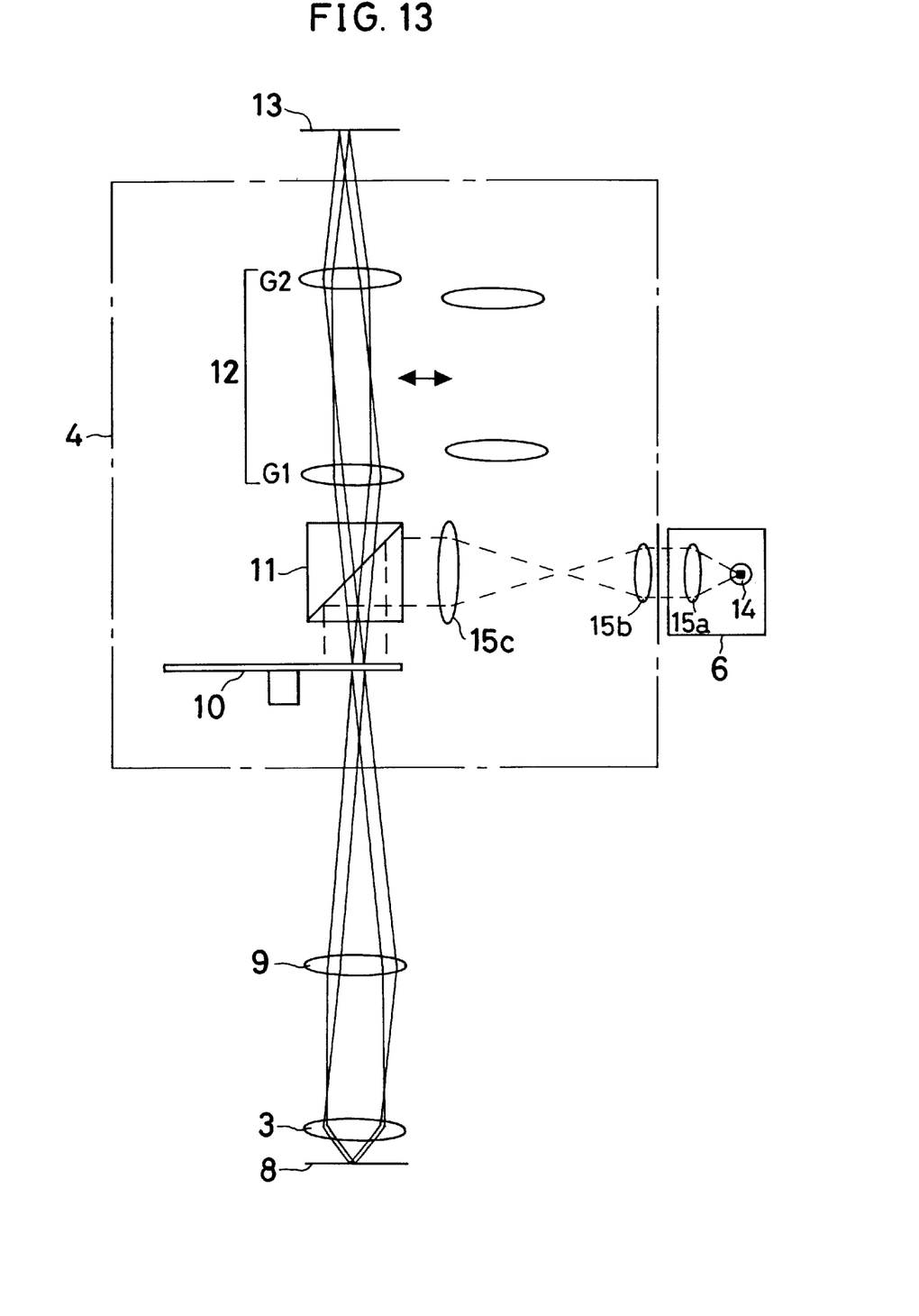
FIG. 13 a diagram showing the arrangement of a confocal microscope optical system according to a seventh embodiment of the present invention.

A seventh embodiment of the present invention will be described below. FIG. 13 is a diagram showing the arrangement of this embodiment. The basic arrangement is the same as that of the first embodiment. In this embodiment, however, the relay optical system 12 is arranged to be switchable to another relay optical system 12. For example, to change the magnification, the relay optical system 12 in the third embodiment and the relay optical system 12 in the fifth embodiment can be switched from one to the other. It should be noted that the switching device may be either a slider type or a turret type.

[Eighth Embodiment]

Figure 14:
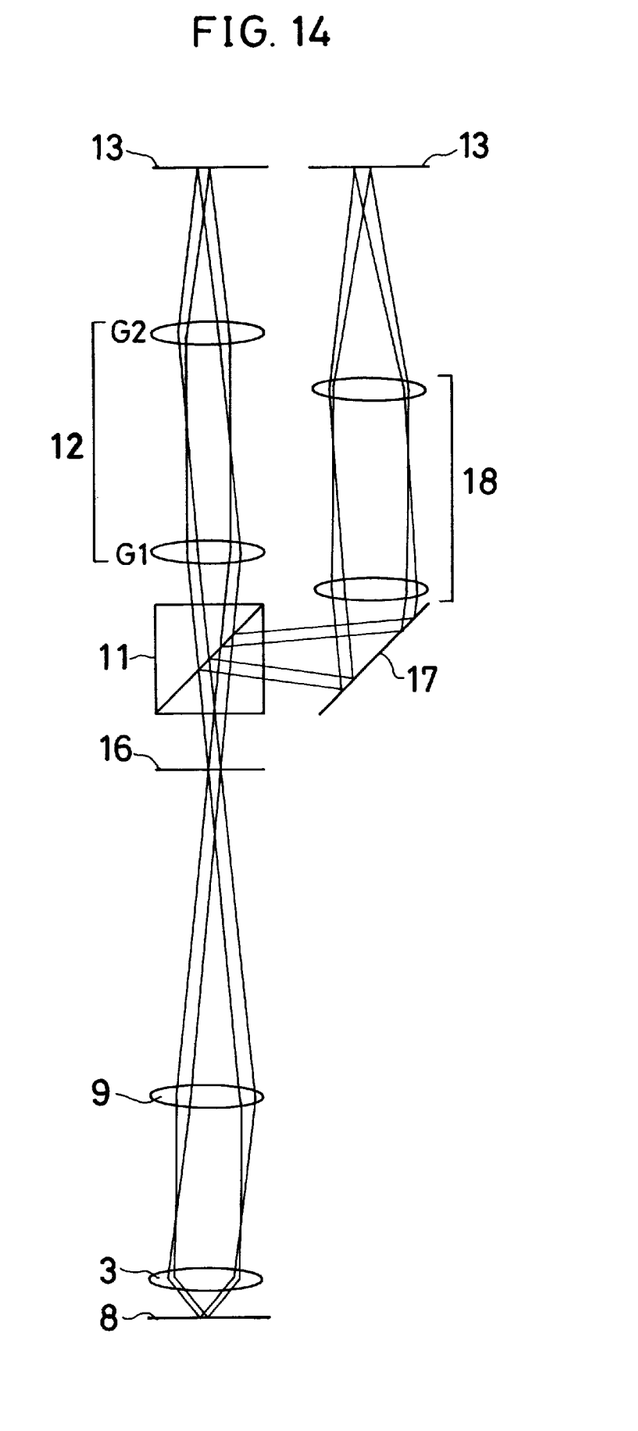
FIG. 14 is a diagram showing the arrangement of a photographic optical system according to an eighth embodiment of the present invention.

An eighth embodiment of the present invention will be described below. The relay optical system according to the present invention is used mainly in a confocal microscope. However, it can also be used in a microscope system having an arrangement such as that shown in FIG. 14 by using an optical path splitting device in place of the optical path coupling device. In FIG. 14, the optical path is split into two optical paths by using an optical path splitting device 11. In one optical path, the relay optical system 12 according to the present invention is placed. In the other optical path, another relay optical system 18 is placed. Each of the relay optical systems 12 and 18 can relay an image of the specimen 8. The specimen images relayed by the two relay optical systems 12 and 18 can be received with respective image pickup devices or photographically recorded with respective photographing devices. The relay optical system 18 may employ either the arrangement according to the present invention or another arrangement. In FIG. 14, reference numeral 16 denotes an intermediate image plane, and 17 denotes a mirror.

Numerical data in the third to sixth embodiments will be shown below. In each embodiment, reference characters $r_1$, $r_2$ . . . are the radii of curvature of lens surfaces; $d_1$, $d_2$ . . . are the spacings between adjacent lens surfaces; $n_{d1}$, $n_{d2}$ . . . are the refractive indices of the lenses for the spectral d-line; and $v_{d1}$, $v_{d2}$ . . . are the Abbe's numbers of the lenses for the spectral d-line.

Third Embodiment

| | $d_0 = 12.0000$ | | |
|---|---|---|---|
| $r_1 = \infty$ | $d_1 = 19.8000$ | $n_{d1} = 1.72825$ | $v_{d1} = 28.46$ |
| $r_2 = \infty$ | $d_2 = 8.9632$ | | |
| $r_3 = 20.0989$ | $d_3 = 8.8641$ | $n_{d2} = 1.74100$ | $v_{d2} = 52.64$ |
| $r_4 = -46.6065$ | $d_4 = 8.6719$ | | |
| $r_5 = -9.6487$ | $d_5 = 9.4372$ | $n_{d3} = 1.72151$ | $v_{d3} = 29.23$ |
| $r_6 = 64.8659$ | $d_6 = 2.0000$ | | |
| $r_7 = 20.4328$ | $d_7 = 5.8304$ | $n_{d4} = 1.48749$ | $v_{d4} = 70.23$ |
| $r_8 = -17.6431$ | $d_8 = 36.4284$ | | |
| $r_9 = 67.5161$ | $d_9 = 4.5256$ | $n_{d5} = 1.74100$ | $v_{d5} = 52.64$ |
| $r_{10} = -46.7946$ | $d_{10} = 24.4774$ | | |

Fourth Embodiment

| | $d_0 = 12.0000$ | | |
|---|---|---|---|
| $r_1 = \infty$ | $d_1 = 19.8000$ | $n_{d1} = 1.72825$ | $v_{d1} = 28.46$ |
| $r_2 = \infty$ | $d_2 = 7.9863$ | | |
| $r_3 = 85.9529$ | $d_3 = 6.4912$ | $n_{d2} = 1.48749$ | $v_{d2} = 70.23$ |
| $r_4 = -41.5676$ | $d_4 = 1.3344$ | | |
| $r_5 = 29.5500$ | $d_5 = 9.4999$ | $n_{d3} = 1.74100$ | $v_{d3} = 52.64$ |
| $r_6 = -180.9993$ | $d_6 = 2.8178$ | $n_{d4} = 1.67270$ | $v_{d4} = 32.10$ |
| $r_7 = 36.2289$ | $d_7 = 26.3676$ | | |
| $r_8 = 13.4276$ | $d_8 = 5.9363$ | $n_{d5} = 1.48749$ | $v_{d5} = 70.23$ |
| $r_9 = -30.6925$ | $d_9 = 1.5145$ | | |
| $r_{10} = -87.3947$ | $d_{10} = 9.1114$ | $n_{d6} = 1.69895$ | $v_{d6} = 30.13$ |
| $r_{11} = 7.7658$ | $d_{11} = 8.6643$ | | |
| $r_{12} = 45.1841$ | $d_{12} = 6.5557$ | $n_{d7} = 1.74100$ | $v_{d7} = 52.64$ |
| $r_{13} = -17.3257$ | $d_{13} = 23.4736$ | | |

Fifth Embodiment

| | $d_0 = 12.0000$ | | |
|---|---|---|---|
| $r_1 = \infty$ | $d_1 = 19.8000$ | $n_{d1} = 1.72825$ | $v_{d1} = 28.46$ |
| $r_2 = \infty$ | $d_2 = 9.0000$ | | |
| $r_3 = 62.2854$ | $d_3 = 5.9482$ | $n_{d2} = 1.74100$ | $v_{d2} = 52.64$ |
| $r_4 = -78.6813$ | $d_4 = 31.3452$ | | |
| $r_5 = 22.3118$ | $d_5 = 5.0002$ | $n_{d3} = 1.48749$ | $v_{d3} = 70.23$ |
| $r_6 = \infty$ | $d_6 = 0.5840$ | | |
| $r_7 = 17.5187$ | $d_7 = 5.8180$ | $n_{d4} = 1.48749$ | $v_{d4} = 70.23$ |
| $r_8 = -32.5149$ | $d_8 = 5.0810$ | $n_{d5} = 1.72151$ | $v_{d5} = 29.23$ |
| $r_9 = 7.8814$ | $d_9 = 3.8189$ | | |
| $r_{10} = -12.8841$ | $d_{10} = 4.0182$ | $n_{d6} = 1.71850$ | $v_{d6} = 33.52$ |
| $r_{11} = 24.4404$ | $d_{11} = 6.5206$ | $n_{d7} = 1.60311$ | $v_{d7} = 60.64$ |
| $r_{12} = -11.4781$ | $d_{12} = 0.7542$ | | |
| $r_{13} = 35.1810$ | $d_{13} = 5.8203$ | $n_{d8} = 1.74100$ | $v_{d8} = 52.64$ |
| $r_{14} = -29.6409$ | $d_{14} = 24.9217$ | | |

Sixth Embodiment

| | $d_0 = 12.0000$ | | |
|---|---|---|---|
| $r_1 = \infty$ | $d_1 = 19.8000$ | $n_{d1} = 1.72825$ | $v_{d1} = 28.46$ |
| $r_2 = \infty$ | $d_2 = 10.4220$ | | |
| $r_3 = 17.7707$ | $d_3 = 5.4072$ | $n_{d2} = 1.74100$ | $v_{d2} = 52.64$ |
| $r_4 = -20.2454$ | $d_4 = 3.1463$ | $n_{d3} = 1.64769$ | $v_{d3} = 33.79$ |
| $r_5 = 381.6570$ | $d_5 = 8.3757$ | | |
| $r_6 = -9.8104$ | $d_6 = 3.3218$ | $n_{d4} = 1.69895$ | $v_{d4} = 30.13$ |
| $r_7 = 46.4323$ | $d_7 = 2.0000$ | | |
| $r_8 = 24.6751$ | $d_8 = 5.7865$ | $n_{d5} = 1.70154$ | $v_{d5} = 41.24$ |
| $r_9 = -26.7896$ | $d_9 = 40.0998$ | | |
| $r_{10} = 44.7108$ | $d_{10} = 2.0000$ | $n_{d6} = 1.64769$ | $v_{d6} = 33.79$ |
| $r_{11} = 15.5275$ | $d_{11} = 4.4976$ | $n_{d7} = 1.51823$ | $v_{d7} = 58.90$ |
| $r_{12} = -23.8186$ | $d_{12} = 33.7041$ | | |

Figure 15A:
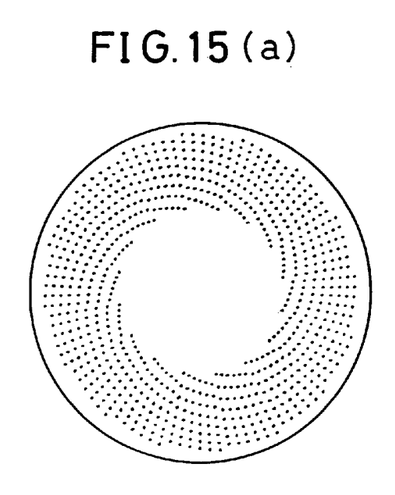
FIG. 15(a) shows a Nipkow disc having a spiral pinhole pattern.
Figure 15B:
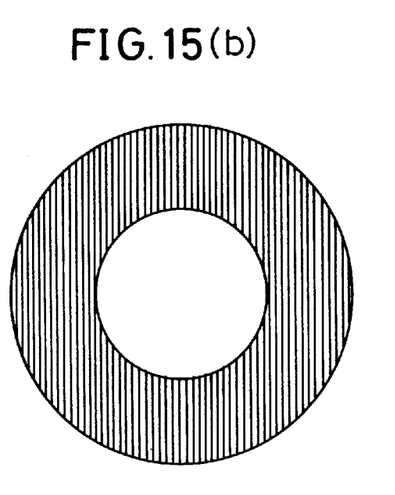
FIG. 15(b) shows an Nipkow disc having a stripe pattern.
Figure 15C:
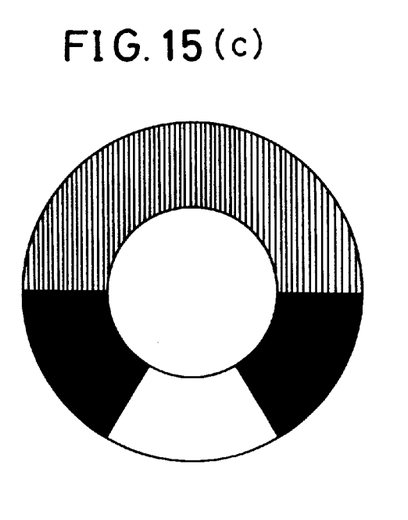
FIG. 15(c) shows a Nipkow disc having a stripe pattern, a light-transmitting region and a light-blocking region.

It should be noted that the scanning disc 10 used in the confocal microscope according to the present invention may be a Nipkow disc such as that shown in part (a) of FIG. 15. Other examples of the scanning disc 10 usable in the present invention include a scanning disc having a stripe pattern formed on the whole surface thereof as shown in part (b) of FIG. 15. That is, thin lines (white portions) that transmit light and thin lines (black portions) that cut off light are alternately arranged on a disc. It is also possible to use a scanning disc having, as shown in part (c) of FIG. 15, a stripe-pattern region, a wide region (white portion) that transmits light, and wide regions (black portions) that cut off light. A scanning disc having an arrangement other than those shown in FIG. 15 may also be used.

Figure 16:
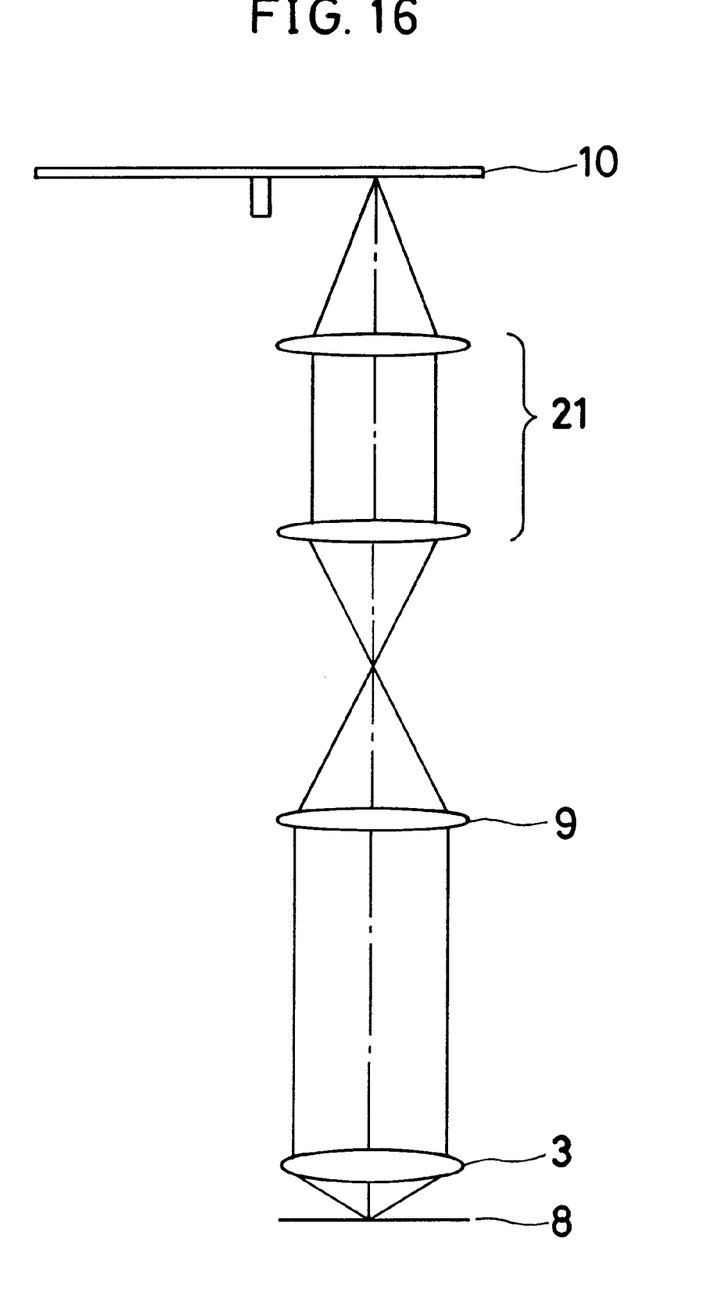
FIG. 16 is a diagram showing a modification of a confocal microscope optical system.

Although in the confocal microscope optical systems shown in FIGS. 1, 13 and 14 the scanning disc 10 is placed at a position where an image of the specimen 8 is formed by the objective lens 3 and the image-forming lens 9, the scanning disc 10 may also be placed at a position where a conjugate image of the specimen image is formed by an image re-forming optical system 21 as shown in FIG. 16.

As will be clear from the foregoing description, it is possible according to the present invention to provide a confocal unit used mainly for observation of an image of a specimen by obtaining a confocal image and further imaging and displaying the confocal image with an image pickup device and a display device, which can be removably attached to a microscope body to construct a confocal microscope that is compact in size as a whole and suffers a minimal loss of brightness. It is also possible to provide a relay optical system used mainly in the above-described confocal microscope, which has a compact structure with a reduced overall length.

What we claim is:

1. A confocal microscope comprising:

a light source;

a scanning disc placed at one of an image position of an objective lens and an image-forming lens, a position conjugate to the image position, and a position proximate either of these positions;

an illuminating optical system placed between said light source and said scanning disc to lead light from said light source to said scanning disc;

said objective lens being provided in a microscope body to converge light from said scanning disc onto a specimen;

a relay optical system adapted to relay light from said specimen that has passed through said objective lens and said scanning disc and to form an image; and an image pickup device placed at a position where said image is formed;

wherein said illuminating optical system, said scanning disc and said relay optical system are arranged as a unit separate from said microscope body, said unit being removably attached to said microscope body, and wherein said scanning disc, said relay optical system and said image pickup device are placed approximately in series.

2. A confocal microscope according to claim 1, wherein said relay optical system includes, in order from a specimen side thereof, a first lens unit and a second lens unit, each having a positive foal length, wherein each of said first lens unit and second lens unit includes one of a positive single lens and a positive cemented lens, which has a convex surface directed toward the specimen side and is placed closest to the specimen side in each of said first lens unit and second lens unit, and wherein at least one of said first lens unit and second lens unit has a lens having a concave surface, and the following condition is satisfied:

$$L/8 \leq D \leq L/3 \quad (1)$$

where L is a distance from the image position of said objective lens to an image pickup surface of said image pickup device, and D is a distance from a final surface of said first lens unit to a first surface of said second lens unit.

3. A confocal microscope according to claim 2, which satisfies the following condition:

$$|\phi_-| \geq 1.5\phi_+ \quad (2)$$

where $\phi_-$ is a total sum of reciprocals of focal lengths of each negative lens included in said relay optical system, and $\phi_+$ is a reciprocal of a focal length of either one of positive lenses closest to the specimen side in said first lens unit and said second lens unit that has a greater value for the reciprocal of its focal length.

4. A confocal microscope according to claim 2 or 3, wherein one of a mirror member and a prism member is placed between said scanning disc and said relay optical system to lead light from said illuminating optical system to said scanning disc.

5. A confocal microscope according to claim 1, wherein said relay optical system is removably attached to the microscope body such that it may be replaced by another relay optical system.

6. A relay optical system comprising, in order from a specimen side thereof, a first lens unit and a second lens unit, each having a positive focal length, wherein each of said first lens unit and second lens unit includes one of a positive single lens and a positive cemented lens, which has a convex surface directed toward the specimen side and is placed closest to the specimen side in each of said first lens unit and second lens unit, and wherein at least one of said first lens unit and second lens unit has a lens having a concave surface, and the following condition is satisfied:

$$L/8 \leq D \leq L/3 \quad (1)$$

where L is a distance from an image position of an objective lens and an image-forming lens to an image pickup surface of an image pickup device, and D is a distance from a final surface of said first lens unit to a first surface of said second lens unit.

7. A relay optical system according to claim 6, which satisfies the following condition:

$$|\phi_-| \geq 1.5\phi_+ \quad (2)$$

where $\phi_-$ is a total sum of reciprocals of focal lengths of each negative lens included in said relay optical system, and $\phi_+$ is a reciprocal of a focal length of either one of positive lenses closest to the specimen side in said first lens unit and said second lens unit that has a greater value for the reciprocal of its focal length.

* * * * *